(12) United States Patent
Petzold et al.

(10) Patent No.: US 11,460,429 B2
(45) Date of Patent: Oct. 4, 2022

(54) METHOD FOR PRODUCING AN ISE HALF-CELL, ISE HALF-CELL, SENSOR, AND MULTI-PARAMETER SENSOR

(71) Applicant: Endress+Hauser Conducta GmbH+Co. KG, Gerlingen (DE)

(72) Inventors: Holm Petzold, Dresden (DE); Jens Vettermann, Grossweitzschen (DE); Erik Hennings, Freiberg (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 838 days.

(21) Appl. No.: 16/103,816

(22) Filed: Aug. 14, 2018

(65) Prior Publication Data
US 2019/0049402 A1 Feb. 14, 2019

(30) Foreign Application Priority Data

Aug. 14, 2017 (DE) ............ 10 2017 118 500.3
Nov. 30, 2017 (DE) ............ 10 2017 128 444.3
Feb. 6, 2018 (DE) ............ 10 2018 102 606.4

(51) Int. Cl.
*G01N 27/333* (2006.01)
*G01N 27/30* (2006.01)
*G01N 27/31* (2006.01)

(52) U.S. Cl.
CPC ........... *G01N 27/31* (2013.01); *G01N 27/301* (2013.01); *G01N 27/302* (2013.01); *G01N 27/3335* (2013.01)

(58) Field of Classification Search
CPC .... G01N 27/31; G01N 27/301; G01N 27/302; G01N 27/3335; G01N 27/333;
(Continued)

(56) References Cited

U.S. PATENT DOCUMENTS 3,657,095 A * 4/1972 Tosteson ............ G01N 27/3335
204/409
4,486,290 A 12/1984 Cahalan et al.
(Continued)

FOREIGN PATENT DOCUMENTS

CN 1123913 A 6/1996
CN 1704152 A 12/2005
(Continued)

OTHER PUBLICATIONS

N. Ishibashi, et al. Surfactant-Selective Electrode Based on Poly-(vinyl chloride) Membrane Plasticized with o-Nitrophenyl Octyl Ether, Analytical Sciences, vol. 2, No. 5, pp. 487-488 (1986) (Year: 1986).*
(Continued)

*Primary Examiner* — Maris R Kessel
(74) *Attorney, Agent, or Firm* — Kelly J. Smith; Endress+Hauser (USA) Holding Inc.

(57) ABSTRACT

The present disclosure discloses a method for producing an ISE half-cell, including the steps of: immersing a first end of a hollow body into a membrane solution comprising at least one solvent and an ion-specific ionophore; removing the hollow body from the membrane solution; drying the hollow body and evaporating the solvent from the membrane solution, whereby an ion-selective membrane is created at the immersed end of the hollow body; and completing the hollow body to make an ISE half-cell. The present disclosure also discloses an ISE half-cell that is produced according to such a method. The present disclosure further discloses a sensor and a multiparameter sensor comprising several such ISE half-cells.

7 Claims, 5 Drawing Sheets

(58) Field of Classification Search
CPC ........ G01N 27/36; G01N 27/38; G01N 27/40;
G01N 27/401; G01N 27/4163–4168
See application file for complete search history.

(56) References Cited

U.S. PATENT DOCUMENTS

| | | | |
|---|---|---|---|
| 4,549,951 A * | 10/1985 | Knudson | G01N 27/3335 427/299 |
| 5,401,377 A | 3/1995 | Shieh et al. | |
| 5,807,471 A * | 9/1998 | Dror | G01N 27/40 204/403.06 |
| 6,484,887 B1 * | 11/2002 | Fukutomi | B01D 61/243 210/321.6 |
| 2005/0006237 A1 * | 1/2005 | Larkin | G01N 27/3335 204/416 |
| 2014/0174923 A1 | 6/2014 | Rao | |
| 2015/0226695 A1 | 8/2015 | Bakker et al. | |
| 2016/0137541 A1 * | 5/2016 | Zilly | G01N 27/283 65/161 |
| 2016/0257035 A1 | 9/2016 | Fils et al. | |
| 2017/0160228 A1 * | 6/2017 | Pechstein | G01N 27/333 |

FOREIGN PATENT DOCUMENTS

| | | |
|---|---|---|
| GB | 1505343 A | 3/1978 |
| WO | 8601601 A1 | 3/1986 |

OTHER PUBLICATIONS

Edward M. Petrie, Bonding Solutions for Low Surface Energy Substrates, Special Chem, Feb. 27, 2017, pp. 1-20, <https://adhesives.specialchem.com/tech-library/article/bonding-solutions-for-low-surface-energy-substrates> (last accessed Feb. 17, 2022).*
Farnoush Faridbod, et al.; The fabrication of potentiometric membrane sensors and their applications; African Journal of Biotechnology, vol. 6, No. 25, pp. 2960-2987, Dec. 28, 2007.

* cited by examiner

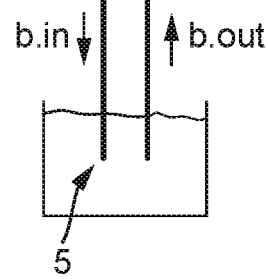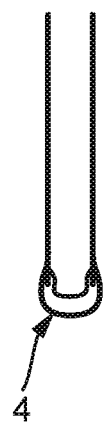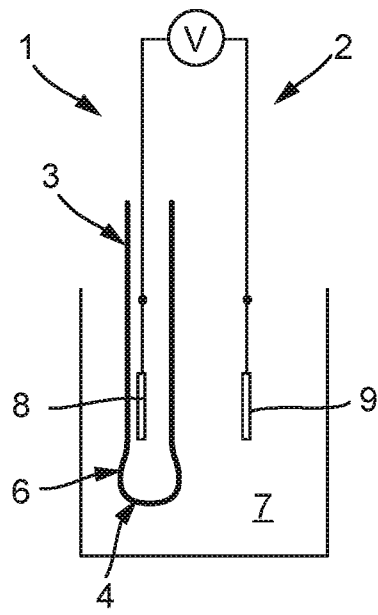
Fig. 1a  Fig. 1b  Fig. 1c  Fig. 1d
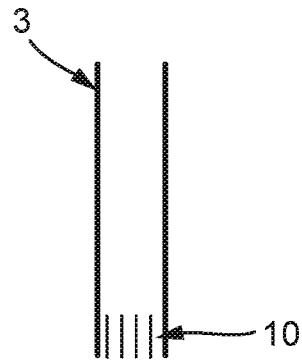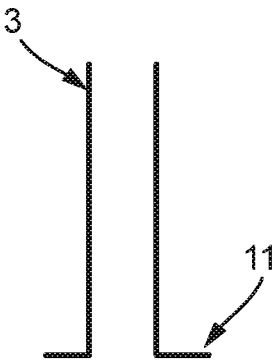
Fig. 2a  Fig. 2b

METHOD FOR PRODUCING AN ISE HALF-CELL, ISE HALF-CELL, SENSOR, AND MULTI-PARAMETER SENSOR

CROSS-REFERENCE TO RELATED APPLICATIONS

The present application is related to and claims the priority benefit of German Patent Application No. 10 2017 118 500.3 filed on Aug. 14, 2017, German Patent Application No. 10 2017 1128 444.3 filed Nov. 30, 2017 and German Patent Application No. 10 2018 102 606.4 filed Feb. 6, 2018 the entire contents of which are incorporated herein by reference.

TECHNICAL FIELD

The present disclosure relates to a method for producing an ISE half-cell, an ISE half-cell, a sensor comprising such an ISE half-cell, and a multi-parameter sensor comprising at least two ISE half-cells.

BACKGROUND

An ion-selective electrode, also called an ion-specific electrode or ion-sensitive electrode (ISE), serves as a sensor for the concentration or, more precisely, the activity of a specific dissolved ion. For the measurement, the ion-selective electrode (1st half-cell) and a second electrode (2nd half-cell), which may be referred to as a reference electrode, are immersed into a medium to be measured and the voltage between the two electrodes may be measured. The sought concentration may then be determined from this.

The measurand is a concentration-dependent voltage to the reference electrode. According to the Nernst equation, this voltage depends logarithmically upon the activity of the respective ion. A well-known ion-selective electrode is a pH electrode, which responds to protons (hydrogen ions or hydronium ions). Ion-selective electrodes are used in many fields, e.g., in analytical chemistry, including environmental analysis, in biochemical and biophysical research, and in industrial processes, such as, for example, process automation engineering.

The central component of the ISE is an ion-selective membrane, which separates an electrode contained in an electrode housing from the solution to be determined. The membrane has a composition that varies depending upon the ion to be determined. Exemplary membrane types are crystalline or vitreous solids, or composites with polymers.

The membranes are typically cast as flat base membranes; a polymer solution, e.g., PVC with softeners and ionophores, in a suitable solvent, e.g., THF, may be used as a casting solution. After drying, small pieces are cut out or punched from the base membrane. These membranes are normally clamped or glued in order to install them in a fluid-tight manner (without bypass) in caps in an ISE half-cell.

The clamping as a non-positive fit may lead to a stressing of the membrane, which in turn may lead to leakage. In a relatively short amount of time, a distinct loosening of the non-positive fit is to be anticipated at the soft membrane, due to settling. Furthermore, a leaching of the softener leads to a shrinking of the membrane. After a longer placement time, the combination of settling of the membrane and shrinking of the membrane may lead to bypasses, which may lead to a loss in the measurement properties.

In order to compensate for settling and shrinking of the membrane, clamping devices that are costly in terms of design and manufacturing may be used. The clamping device may be comprised of two membrane placement surfaces that can be displaced relative to one another. The two must tightly seal the exterior and interior.

SUMMARY

The present disclosure is based upon the aim of proposing a production method for producing ISE membranes with minimal method steps, and with as few individual parts as possible.

The method disclosed herein may generally include steps of: immersing a first end of a hollow body into a membrane solution comprising at least one solvent and an ion-specific ionophore; removing the hollow body from the membrane solution; drying the hollow body and evaporating the solvent from the membrane solution. An ion-selective membrane may thereby be created at the immersed end of the hollow body. The method may also include a step of completing the hollow body to make an ISE half-cell.

A production method thereby results for ISE half-cells on a hollow body. The principle is based at least partly upon a membrane formation via immersion into a polymer solution and drying. The half-cell may include a membrane connected positively and/or materially, and without stress, to the hollow body.

In order to influence the shape, and the thickness of the membrane, the steps of immersing and drying, according to one embodiment, may be executed multiple times.

In one embodiment, the membrane solution comprises a polymer solution. The membrane solution may thereby also be created by fusion of a polymer. In one embodiment, the membrane solution is specifically modified with the aid of softeners and solvents.

In one embodiment, a microscopic surface modification may be performed on the hollow body to improve the adhesion. Examples of such a modification include roughening, plasma treatment, application of an adhesion promoter, grinding, sandblasting, etching, and/or coating.

In one embodiment, the hollow body with the membrane is dipped into an additional solution in order to apply a functional layer; in particular, the functional layer may be an anti-fouling layer or a layer with a low wetting capability of the surface, such as, for example, by means of the lotus effect.

In one embodiment, the method further includes a step of introducing a metallic support structure on or in the ion-selective membrane. The mechanical stability of the membrane may thereby be improved. The support structure, which, for instance, may be designed as a grid, is thereby situated in or on the membrane. The support structure may also be designed from ceramic or plastic. The support structure may also be introduced into the functional layer and/or between the membrane and the functional layer, whereby a sandwich structure results.

In one embodiment, the method further includes a step of applying an overpressure at the first end or at a second end of the hollow body after the dipping and removal of the hollow body from the membrane solutions. The overpressure may thereby be either positive or negative ("underpressure").

In one embodiment, the completion of the hollow body to make an ISE half-cell includes at least a step of filling an inner electrolyte into the hollow body, and introducing a reference electrode into the interior of the hollow body.

In one embodiment, the completion of the hollow body to make an ISE half-cell includes at least the step of attaching the hollow body to an electrode shaft that can be filled with inner electrolyte.

In one embodiment, an exchangeable cap may result.

An ion-selective half-cell may be produced from a method as presented above.

In one embodiment, the hollow body may comprise, for example, at least one furrow, groove, score, rib, flute, notch, undercut, etc., in order to increase the adhesion surface of the membrane or to produce a positive fit.

In one embodiment, on or in the membrane, the half-cell may comprise a support structure, such as, for example, a grid made of metal, plastic, renewable materials, or ceramic.

In one embodiment, the internal diameter of the hollow body is less than or equal to 10 mm or, according to some embodiments, is equal to about 3 mm. In one embodiment, the hollow body may be produced from metal, glass, plastic, ceramic or the like.

In one embodiment, the shape of the membrane may be designed to be hemispherical or shaped like a drop. Of course, other shapes of the membrane are also conceivable.

Some embodiments may include a sensor comprising one ion-selective half-cell as described above.

In one embodiment, the external diameter of the sensor is less than or equal to 12 mm.

In one embodiment, the sensor additionally comprises a reference half-cell.

In one embodiment, the sensor comprises an inductive plug head for connection to a transmitter.

Some embodiments may include a multi-parameter sensor including at least two ion-selective half-cells as described above.

In one embodiment, the multi-parameter sensor may include a reference half-cell.

In one embodiment, the multi-parameter sensor comprises a pH sensor, and the multi-parameter sensor utilizes the reference half-cell of the pH sensor as its reference.

In one embodiment, the multi-parameter sensor has an external diameter of less than or equal to 40 mm.

BRIEF DESCRIPTION OF THE DRAWINGS

FIG. 1a shows an exemplary hollow body, according to the present disclosure;

FIG. 1b shows the exemplary hollow body immersed in a membrane solution with solvent;

FIG. 1c shows a membrane formed on an end of the hollow body;

FIG. 1d illustrates an embodiment for completion of an ISE half-cell;

FIG. 2a shows a hollow body, with a furrow;

FIG. 2b shows a hollow body, with an undercut;

FIG. 3b shows the exemplary hollow body of. FIG. 3a immersed in a membrane solution with solvent;

In the figures, the same features are identified with the same reference symbols.

DETAILED DESCRIPTION

Figure 3A:
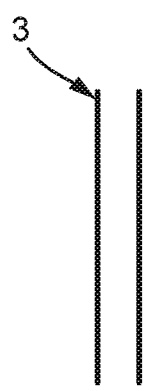
FIG. 3a shows another exemplary hollow body, according to the present disclosure.

As already mentioned, the ISE half-cell 1 comprises an ion-selective membrane 4. For example, the ISE half-cell 1 may be selective to $NH_4^+$, $NO_2^-$, $NO_3^-$, $K^+$ ions.

The membrane 4 may be formed via dipping or immersion of a hollow body 3 into a membrane solution 5 with solvent; see in this regard FIG. 1a and FIG. 1b. The hollow body may be made of glass, plastic pipe, metal, ceramic, or the like. The internal diameter of the hollow body 3 may be approximately 1-10 mm. For example, the internal diameter may be about 3 mm. The hollow body may be cylindrical or may have a polygonal profile, such as, for example, a square profile.

The membrane solution 5 may include at least one solvent and one ion-specific ionophore. With regard to a polymer solution 5, the polymer solution may be made of PVC (polyvinyl chloride) and a softener, for example. According to some embodiments, the solvent may be THF (tetrahydrofuran), for instance. The polymer solution 5 may be at room temperature, but dipping may also take place at increased or decreased temperatures. According to a specific embodiment, the hollow body 3 may be dipped into the polymer solution 5 for approximately 0.1-5 seconds or longer.

In the next step (see FIG. 1b), the hollow body 3 may first be introduced into the polymer solution 5 (arrow b.in) and subsequently drawn out of the polymer solution 5 (arrow b.out). Symbolically depicted in FIG. 1b is a vessel with the polymer solution 5. The membrane 4 may be formed by the surface tension upon withdrawal and may remain in this form.

The membrane 4 is dried in the next step, as shown in FIG. 1c. The membrane 4 dries at room temperature, for instance; however, a higher or lower temperature may be selected. The solvent may evaporate during the drying process.

The membrane thickness may be increased by repeating the dipping and drying process. Further variations are contemplated with regard to the dip medium and/or dipping process.

The viscosity may be varied by changing the composition of the membrane solution 5 thus, for instance, if more solvent is used. Shape and thickness of the formed membrane 4 may thereby be influenced.

The shape and thickness may likewise be varied by applying a positive or negative overpressure to the hollow body 3. In one embodiment, the shape is in the form of a drop or hemisphere.

The hollow body 3 may be activated via prior surface modification. For example, surface modification may be microscopic and used to improve the adhesion properties of the membrane 4 thereon. Some processes considered as surface modifications may include: roughening; plasma treatment; application of an adhesion promoter (surfactants, for instance); grinding; sandblasting; etching (for instance, by means of solvent, acid, or caustic solution); and/or coating.

The hollow body 3 may also comprise at least one furrow 10, groove, score, rib, flute, notch, or an undercut 11 or the like. The adhesion surface may thereby be increased, or an additional positive fit may be generated. See in this regard FIG. 2a and/or FIG. 2b.

An additional functional layer 14 may be applied via an additional dipping or immersion into an additional solution 13. This layer 14 may have something of an anti-fouling effect or a lotus effect.

Figure 3B:
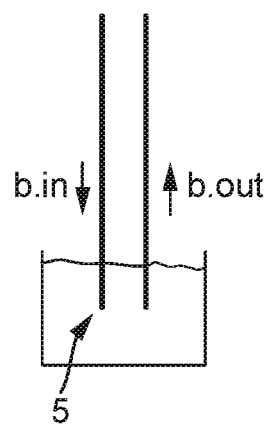
Figure 3C:
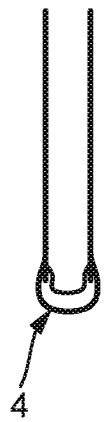
FIG. 3c shows a membrane formed on an end of the hollow body.
Figure 3D:
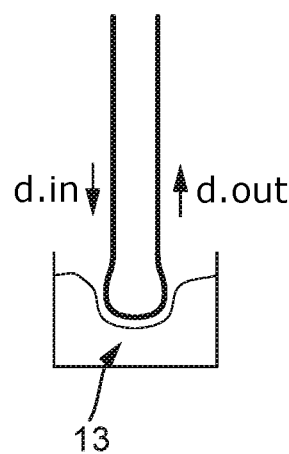
FIG. 3d shows the hollow body dipped into an additional solution.
Figure 3E:
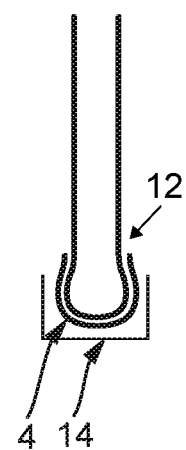
FIG. 3e shows the drying of the hollow body, resulting in creation of a functional layer.

The process steps in FIGS. 3a, 3b, and 3c may be similar to those in FIG. 1a, FIG. 1b, and FIG. 1c. That is, the immersion, withdrawal, and drying of the polymer solution may be present in both illustrated processes. In the next step, in FIG. 3d, the hollow body 3 may be dipped into an additional solution 13 (arrow d.in), whereby, after withdrawal (arrow d.out) and drying (FIG. 3e), the functional layer may be created.

A metallic, ceramic, or plastic grid, or a grid made of a renewable raw material may be applied to or in the membrane 4 in order to improve the mechanical stability of said membrane. In general, a grid 12 may be designed as a support structure. See FIG. 3e. The grid 12 may also be introduced between the membrane 4 and the functional layer 14, or only in the functional layer 14.

An ISE half-cell 1 may be created by filling a suitable inner electrolyte and completion with an inner reference (for example, Ag/AgCl) together with internal electrode 8 in the interior 6; see FIG. 1d. The ISE half-cell 1 may have contact with the medium 7 to be measured via the membrane 4.

The ion-selective electrode is completed by connecting the ISE half-cell 1 with the reference half-cell 2 via a voltage measurement device V. The reference half-cell comprises the external electrode 9, which likewise is located in the medium 7 to be measured.

The method described here may be easily be automated.

Figures 7A, 7B:
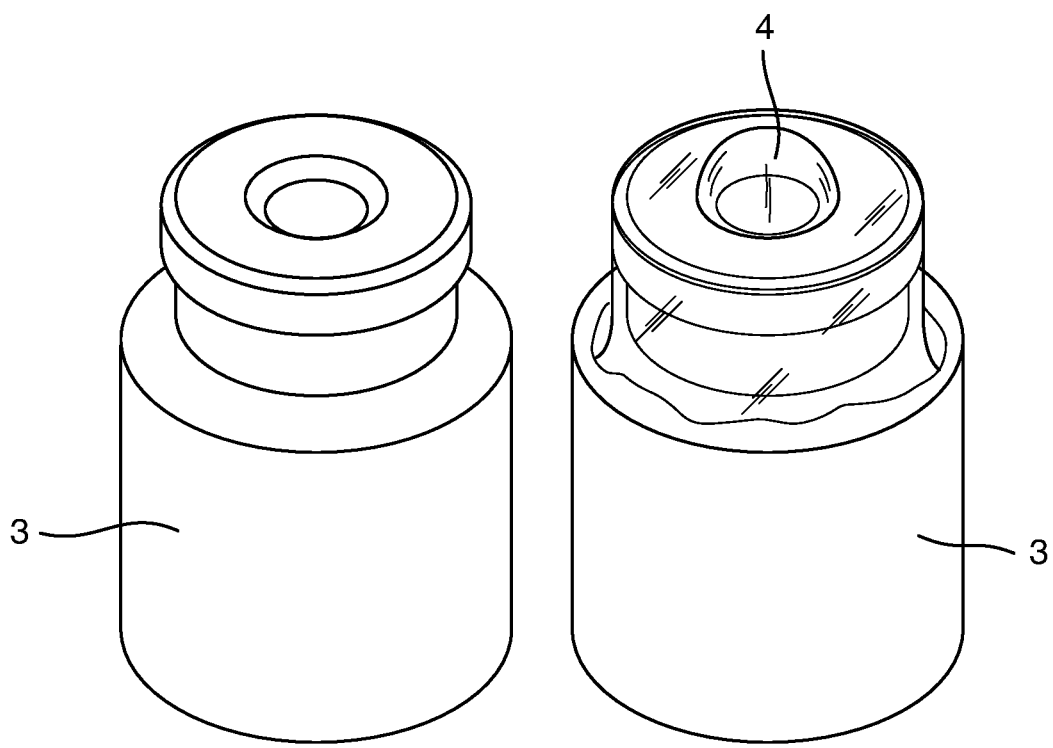
FIG. 7a shows a hollow body before dipping the hollow body in a membrane solution with solvent.
FIG. 7b shows the hollow body of FIG. 7a after dipping the hollow body in the membrane solution with solvent to form a membrane on an end of the hollow body.
Figure 8:
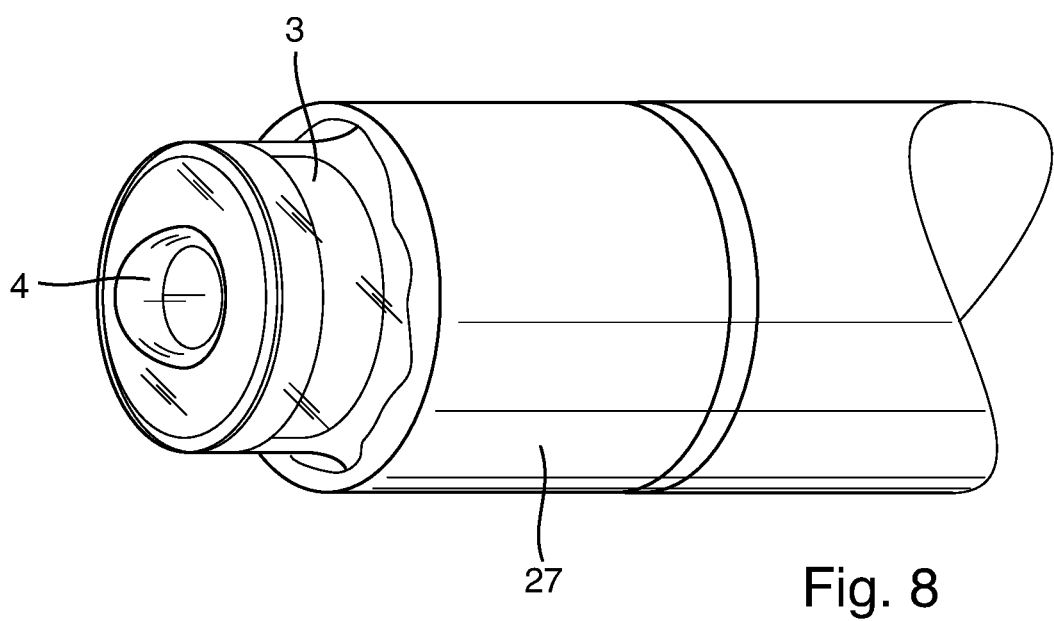
FIG. 8 shows an already-dipped hollow body installed on an electrode shaft.

FIG. 8 shows an alternative to the embodiment in FIG. 1d for completion of an ISE half-cell. FIG. 7a shows a hollow body 3. This is processed according to the method described above; see FIG. 1a, FIG. 1b, and FIG. 1c, from which arises the hollow body 3 from FIG. 7b, together with the membrane 4. The hollow body 3 may be attached to an electrode shaft 27, such as, for example, by screwing, clicking, gluing, and the like. During the process, an exchangeable cap for the electrode shaft 17 may be provided.

Figure 4:
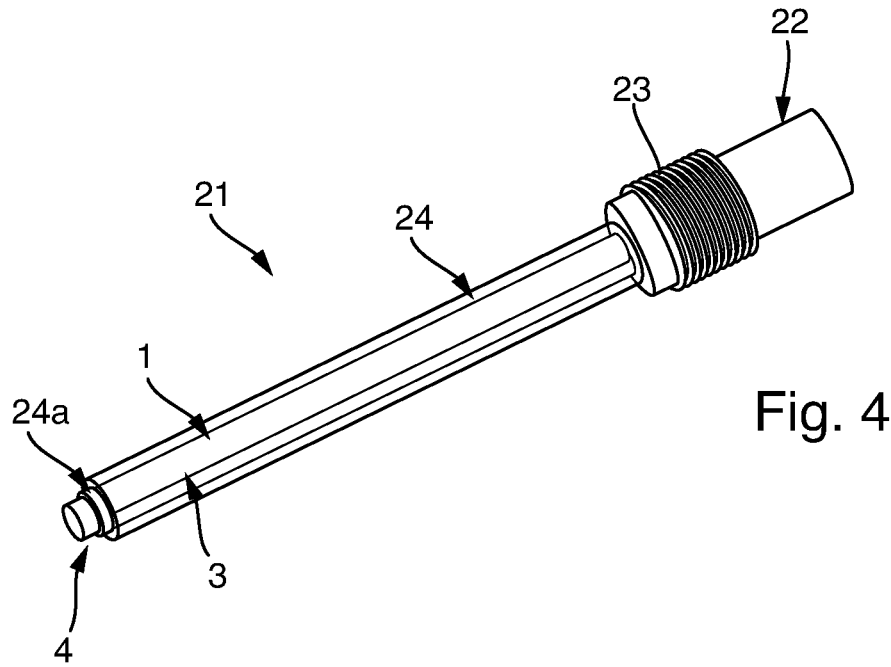
FIG. 4 shows a single-parameter ISE sensor.

FIG. 4 shows a single-parameter ISE sensor 21. A single parameter may be measured by means of the sensor 21, which is designed as a single parameter ISE. Possible parameters are, in this case, $NH_4^+$, $NO_3^-$, $NO_2^-$, $K^+$, $F^-$, or also heavy metal ions.

The membrane 4 is visible at the left end. Arranged inside the sensor 21 is the ISE half-cell 1, with the hollow body 3 together with internal electrode 8.

The sensor 21 may comprise a reference electrode 24 that corresponds to the reference electrode 9 (depicted in FIG. 1d, for instance). The reference 24 is an Ag/AgCl reference electrode that may have contact with an inner electrolyte. The reference 24 corresponds to the reference half-cell 2. According to some embodiments, the reference electrode 24 may be in contact with the medium to be measured via a diaphragm 24a. For example, the diaphragm 24a may be a PTFE diaphragm.

The sensor 21 may have an external diameter of 12 mm.

The sensor 21 may comprise a plug contact 22 for example, such as one of inductive design. For this, the sensor 21 comprises corresponding electronic components which relay the signals of the ion-selective electrode 1 and the reference 24, and process them if necessary. For this, the sensor 21 may comprise a microcontroller.

The sensor 21 or its housing may include a thread 23 for installation in an armature, installation support, or flange.

Figure 5:
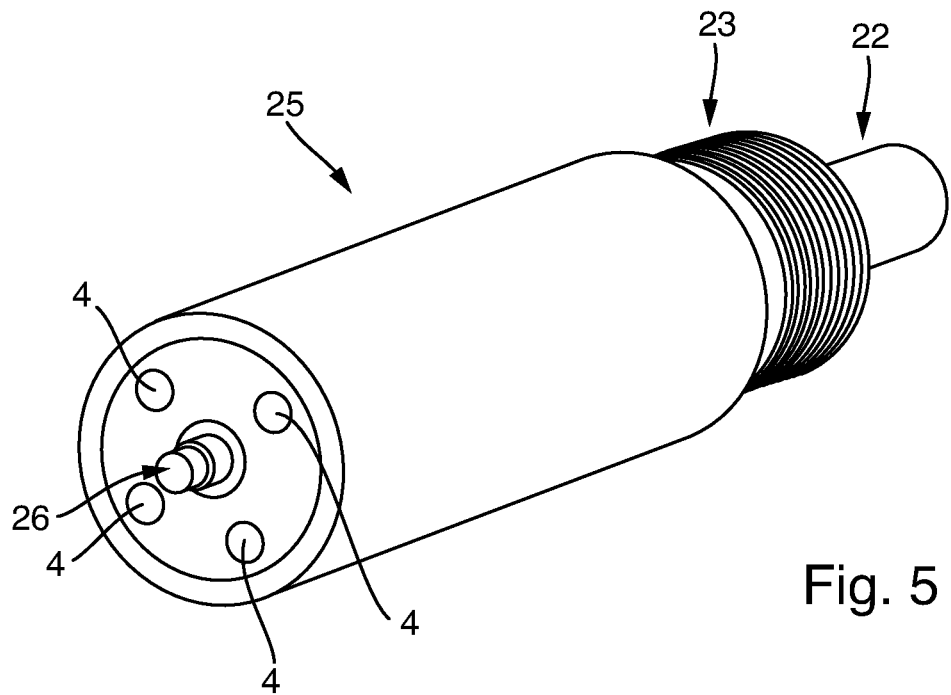
FIG. 5 shows a multi-parameter ISE sensor.
Figure 6:
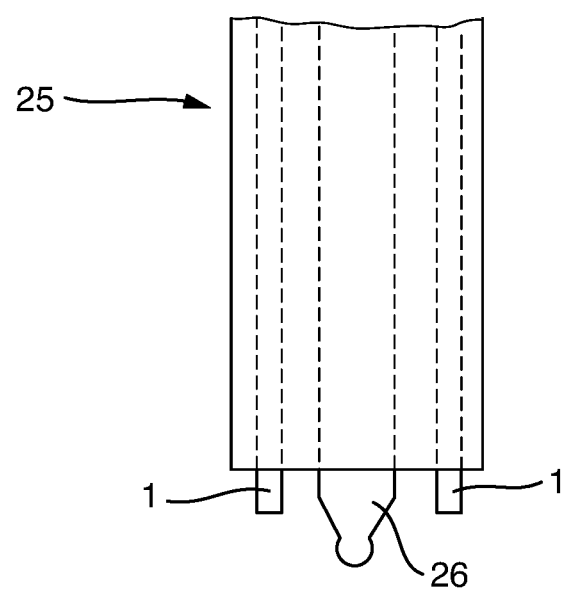
FIG. 6 shows the multi-parameter ISE from FIG. 5, with an upper part of a housing removed.

FIG. 5 and FIG. 6 show a multi-parameter ISE sensor 25. The sensor 25 has a housing with a diameter of 40 mm, for example. Located inside it are at least two, e.g., four, ion-selective half-cells 1. These may relate to different parameters for example, $NH_4^+$, $NO_3^-$, $NO_2^-$, $K^+$, $F^-$, or also heavy metal ions.

Only the membranes 4 of the electrode 1 are visible in FIG. 5. A reference 26 is arranged centrally at the sensor 25. However, the reference 26 does not necessarily need to be arranged centrally. In the present example, the reference is a pH sensor. Better stated, in addition to the ion-selective electrode 1, the sensor 25 may also comprise a pH sensor. In addition to the pH-sensitive part, the pH sensor also comprises a reference electrode 26. For example, this reference electrode 26 is designed as an Ag/AgCl diversion with an inner electrolyte. This reference electrode 26 of the pH sensor may be shared as reference electrode 9 by the ion-selective electrodes 1.

The sensor 25 or its housing may include a thread 23 for installation in an armature, installation support, or flange.

The sensor 25 may comprise a plug contact 22, for example, one of inductive design. For this, the sensor 25 may comprise corresponding electronic components which relay the signals of the ion-selective electrode 1 and the reference 26, and process them if necessary.

The invention claimed is:

1. A method for producing an ion selective electrode (ISE) half-cell, including the steps of:
   immersing a first end of a hollow body into a membrane solution comprising at least one solvent and an ion-specific ionophore;
   removing the hollow body from the membrane solution;
   drying the hollow body and evaporating the solvent from the membrane solution, whereby an ion-selective membrane is created at the first end of the hollow body, and
   completing the hollow body to make an ISE half-cell;
   immersing the first end of the hollow body with the ion-selective membrane into an additional solution in order to apply a functional layer, an anti-fouling layer, or a layer with a low wetting capability of the surface of the ion-selective membrane; and
   applying an overpressure at the first end or at a second end of the hollow body after immersing the first end and removing the hollow body relative to the membrane solution.

2. The method according to claim 1, wherein the steps of immersing the first end and drying are executed multiple times.

3. The method according to claim 1, wherein the membrane solution comprises a polymer solution.

4. The method according to claim 1, further including a step of:
   performing a microscopic surface modification on the hollow body.

5. The method according to claim 1, further including a step of:
   introducing a metallic support structure onto or into the ion-selective membrane.

6. The method according to claim 1, wherein completing the hollow body to make an ISE half-cell includes at least one of the steps of:
   filling an inner electrolyte into the hollow body; and introducing a reference electrode into the interior of the hollow body.

7. The method according to claim 1, wherein completing the hollow body to make an ISE half-cell includes a step of:
attaching the hollow body to an electrode shaft that can be filled with an inner electrolyte.

\* \* \* \* \*